Figure 1:
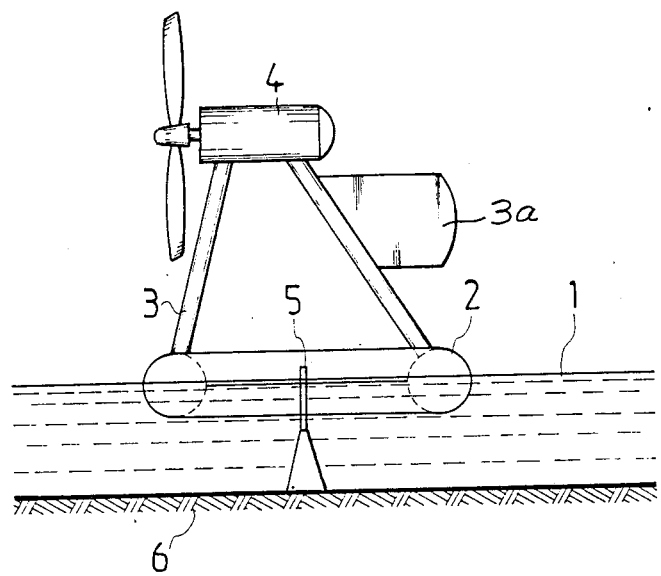

United States Patent [19]

Sundman

[11] Patent Number: 4,775,340
[45] Date of Patent: Oct. 4, 1988

[54] FREELY-FLOATING WIND POWER PLANT

[76] Inventor: Stig Sundman, Dragonvägen 12 A 5, 00330 Helsingfors 33, Finland

[21] Appl. No.: 3,812

[22] Filed: Jan. 16, 1987

Related U.S. Application Data

[63] Continuation of Ser. No. 691,712, Jan. 14, 1985, abandoned, which is a continuation of Ser. No. 413,689, Sep. 1, 1982, abandoned.

[51] Int. Cl.[4] ............................................. B63H 13/00
[52] U.S. Cl. ..................................... 440/8; 114/346
[58] Field of Search .............. 440/8; 114/346; 416/85; 290/42, 55

[56] References Cited

U.S. PATENT DOCUMENTS 1,498,978  6/1924  Mantz ..................... 416/85
4,159,427  6/1979  Wiedemann ............ 290/55

FOREIGN PATENT DOCUMENTS 500792  2/1951  Belgium .
709199  6/1966  Italy .

Primary Examiner—Joseph F. Peters, Jr.
Assistant Examiner—Thomas J. Brahan
Attorney, Agent, or Firm—Browdy and Neimark

[57] ABSTRACT

This invention concerns a wind power plant and/or wind motor-driven craft, consisting of a frame floating on a water surface and upon which has been mounted a tower with a wind-driven generator, and characterized in that the frame consists of a body which is round in the horizontal plane and stable on the water surface.

1 Claim, 1 Drawing Sheet

U.S. Patent

Oct. 4, 1988

4,775,340

FREELY-FLOATING WIND POWER PLANT

This application is a continuation of application Ser. No. 691,712 filed Jan. 14, 1985, now abandoned, which is a continuation of Ser. No. 413,689 filed Sept. 1, 1982, now abandoned.

BACKGROUND OF INVENTION

The present invention concerns a wind power plant and/or a wind driven craft consisting of a frame freely floating on a water surface, upon which frame has been attached a tower with a wind-driven generator affixed to the tower.

A stationary wind driven generator usually consists of a wind-driven rotor mounted to an electric power generator on top of a tower. In order to be able to utilize the energy of the wind independent of its direction, the rotor/generator combination can turn about a vertical axis relative to the stationary tower. This implies two drawbacks, compared with a structure where the rotor points in one given direction all the time. One drawback is that a strongly dimensioned bearing is required at the tower upper end; the other is that the tower must be slender enough all around for the rotor to clear the sides, legs or stays of the tower.

SUMMARY OF INVENTION

The wind-driven plant and/or wind motor-driven craft of the present invention is characterized in that the frame consists of a body which is round in the horizontal plane and stable on the water surface and upon which frame a tower is mounted with a wind-driven generator attached to the tower.

This wind power plant or water craft design implies a simplified construction since no vertical shaft with associated bearing is required high up in the tower. The design also implies lighter and stronger tower structure, since the tower legs and stays on the sides and behind the rotor may be carried far enough out without impeding the rotor's rotation. A lighter tower structure is provided for that reason, as well that violent gusts of wind impose no similar load on the tower's legs as would occur if the legs were rigidly affixed to the rock base. A gust of wind means, mostly, that the tower makes a "curtsey" movement in the water.

An advantageous embodiment of the invention wherein the wind-driven power plant and/or wind motor-driven craft has a drive mechanism such as a propeller located under the water surface and obtains its energy from the wind driven generator located above the water surface is characterized in that the drive mechanism is, together with a rudder or a keel, turnable about a vertical axis. Thus the craft can be maneuvered with ease to travel in any desired direction and the plane of the wind driven rotor and the generator is held substantially perpendicular right against or into the wind at all times.

Another embodiment is characterized in that the frame is anchored to the bottom surface below the water, turnably about its centre-point. Thus it becomes possible for the entire structure to turn with ease to the wind, and no complicated turning mechanisms are needed.

The embodiments are characterized in that the wind-driven generator is driven by means of a rotor. The propeller has very high efficiency and therefore the best possible energy transmission is accomplished.

DESCRIPTION OF INVENTION

The invention is described in detail with reference to the attached drawing, wherein FIG. 1 represents the wind power plant, turnably anchored to the bottom surface below a water surface.

Figure 2:
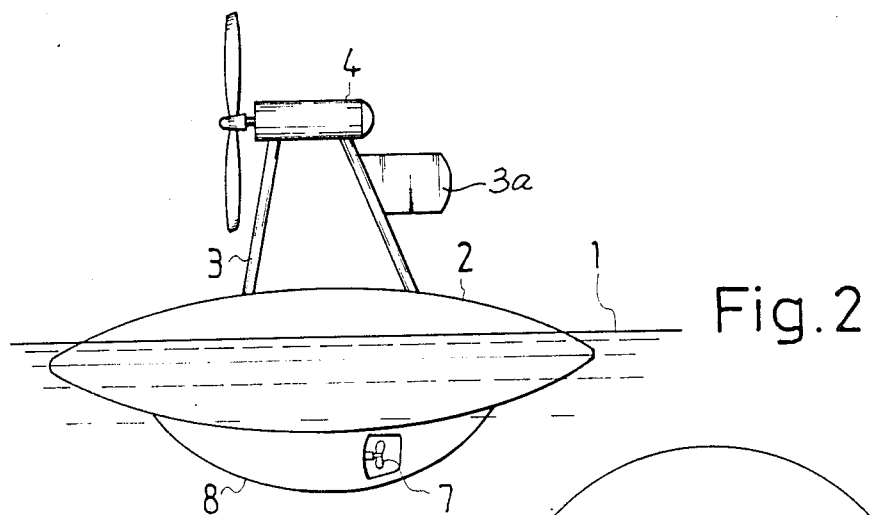
Figure 3:
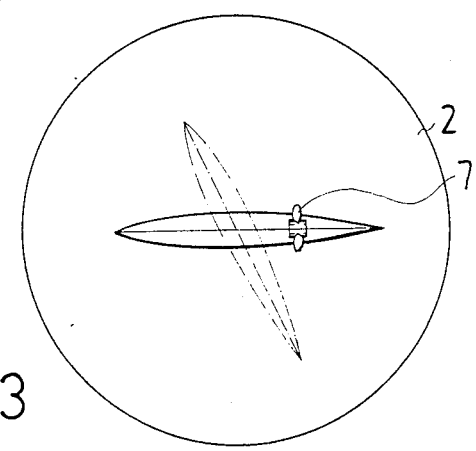

FIG. 2 presents an alternative wind-driven craft freely floating upon a water surface; and FIG. 3 presents the craft depicted in FIG. 2, seen from below.

The wind-driven power plant and/or wind motor-driven craft consists of a frame 2 floating on a water surface 1, and upon which frame has been affixed shaped tower 3 with a wind-driven rotor and generator 4 mounted on top of the tower. The frame 2 consists of a body which is round in the horizontal plane and stable on the water surface 1. In FIG. 1, the frame 2 consists of a circular tube, which is anchored to the bottom 6, below the water surface 1 and is turnable about its centre-point 5. Tail portion 3a extends from the side of the tower 3 opposite the rotor and substantially parallel with the axis of the wind driven-generator 4. The frame 2 in FIG. 2 is disk-shaped and the power plant or craft has a drive mechanism such as a propeller 7 located under the water surface 1, and obtains its energy from the wind driven generator 4 located above the water surface. The propeller 7, together with the craft's keel 8, is turnable about a vertical axis through the frame 2.

Instead of placing the structure on the water surface of a lake or of the sea, it may be anchored in a circularly excavated ditch. Instead of keeping the structure anchored, one or several propellers may be employed under the water surface to keep the structure stationary and even to turn it in accordance with the wind direction.

With the aid of the propeller or propellers, just mentioned, or with the aid of a portable electric motor (outboard motor) obtaining its power from the generator 4, it is possible to navigate the apparatus or wind motor-driven craft under its own power from the factory (shipyard) to a customer at any point whatsoever on the coasts of Earth or out on the open sea.

As a craft, the apparatus has the advantage compared with sailships, that it is able to travel in a direction straight against the wind without having to tack. It is moreover particularly easy to maneuver compared with a sailing craft.

The craft may be constructed to be a disk-shaped tank boat, travelling partly or totally under water, for transporting oil, fresh water, etc. A turnable keel with propeller located under the disk-shaped hull enables the craft to travel in any desired direction with reference to the wind.

The frame or hull hull may also be replaced with a plurality of pontoons. Thus for instance a three-legged tower structure may rest with each of its legs on a boat-shaped pontoon. Each one of these pontoons may turn in any direction and may be driven forward and steered like any boat. Therefore, one obtains a structure wherein three largely conventional vessels are coupled together and constitute the stable base for a wind power plant which provides them with energy.

A wind-driven craft need not necessarily be driven via electric generators and motors. Instead, the rotation of the wind propeller or rotor may be mechanically transmitted, with or without gearing, to the water propeller e.g. via gear wheels and a vertical rotating shaft, or via chains or belts. Naturally, pneumatic or hydraulic power transmission may also be contemplated. The electric generator, if any, need not necessarily be mounted directly on the propeller shaft, but may equally be located down below at the base of the tower, whereby the stability of the structure in the water is increased.

I claim:
1. A wind-driven assembly, comprising:
a frame freely floating on water, upon which frame a tower is rigidly mounted, and including a wind-driven rotor and generator rigidly fixed on top of the tower and a tail portion also fixed to said tower and extending in a direction opposite from said rotor, said frame consisting of a body which is round in a horizontal plane and stable while freely floating on the water, said frame being attached on top of a keel, said keel including propulsion means driven by said generator, and said keel, together with said propulsion means being turnable about a vertical axis with respect to said frame, whereby said propulsion means is able to propel said craft in any direction with respect to a prevailing wind while continuing to be driven by said generator.

* * * * *